Figure 1:
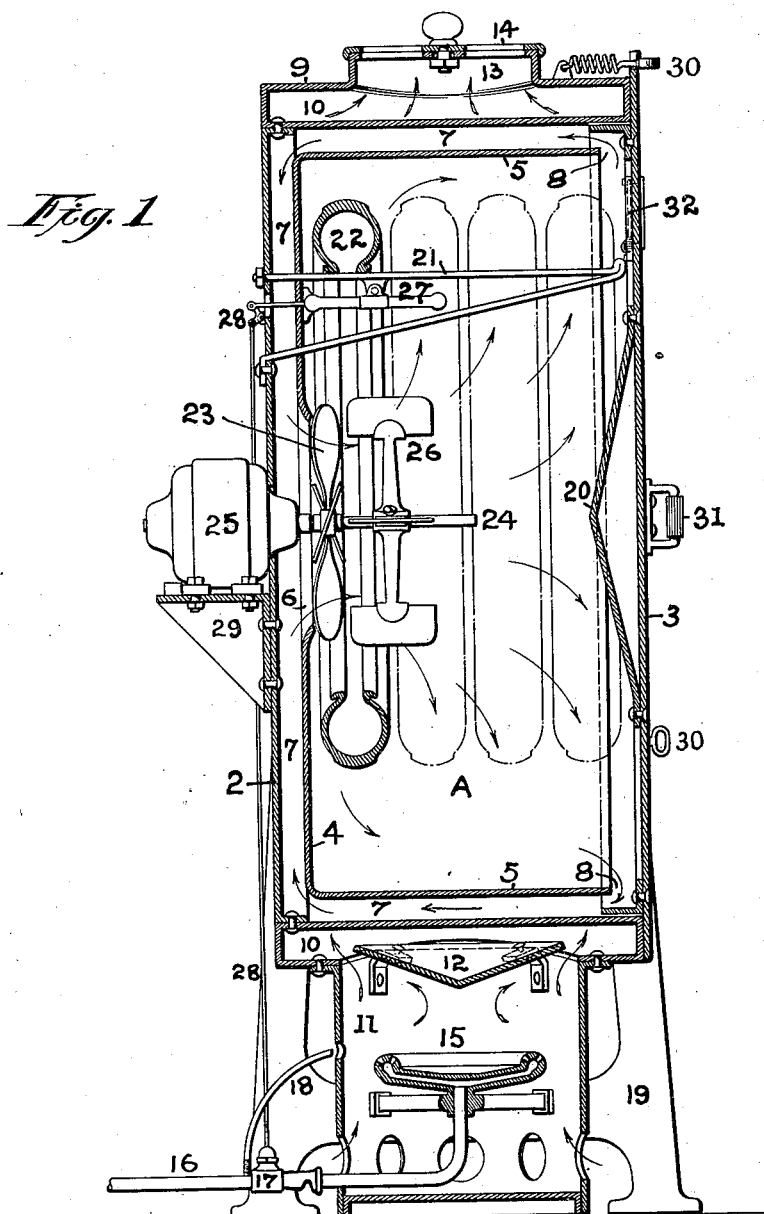

K. L. EMMONS.
OVEN FOR VULCANIZING, BAKING, AND OTHER USES.
APPLICATION FILED DEC. 12, 1919.

1,420,371. Patented June 20, 1922.

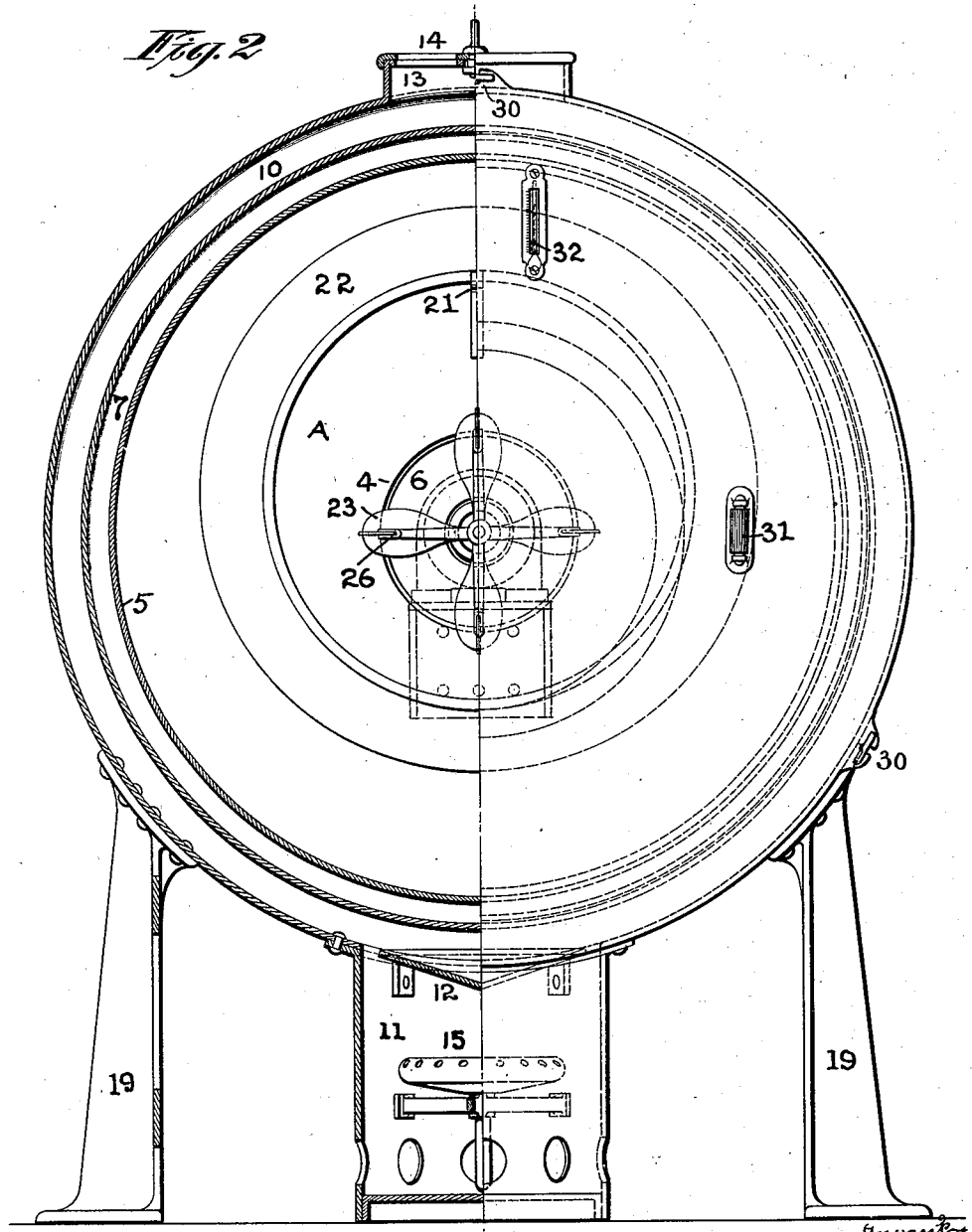

UNITED STATES PATENT OFFICE.

KENNETH L. EMMONS, OF WILMINGTON, DELAWARE.

OVEN FOR VULCANIZING, BAKING, AND OTHER USES.

1,420,371. Specification of Letters Patent. Patented June 20, 1922.

Application filed December 12, 1919. Serial No. 344,444.

*To all whom it may concern:*

Be it known that I, KENNETH L. EMMONS, a citizen of the United States, and resident of Wilmington, county of New Castle, and State of Delaware, have invented an Improvement in Ovens for Vulcanizing, Baking, and Other Uses, of which the following is a specification.

The object of my invention is to provide a novel construction of oven for baking enamel, etc., for vulcanizing, for drying, and for any of the numerous uses in the commercial art to which such an invention may be applied.

More particularly, my object is to so construct an oven that the air content of the enclosed chamber may be circulated in such manner that a uniform temperature may be insured in all parts of the chamber, whereby satisfactory results may be obtained at all times with maximum efficiency.

My object is further to maintain the temperature required in the inner chamber of the oven, by causing the heated products from a suitable burner to circulate around the casing of the oven and at the same time cause the heated air within the oven chamber to be rapidly circulated so that a relatively high temperature may be given to the heating medium without danger of burning by irregular oven heating of the contents of the oven chamber.

My object is also to so construct the means for circulating the air within the oven chamber, that the air is drawn over the highly heated walls, then discharged centrally of the oven chamber and immediately dispersed radially and with a circulatory motion, whereby a thorough mixing and distribution is insured.

As a result of the provision for proper heating and perfect circulation, I am enabled to accomplish the vulcanizing, or drying of enamel and other substances, in a materially less time than has heretofore been required and without danger to overheating; for in addition to the attainment of the objects aforesaid, directed to the heating and circulation, I provide thermostatically operated means for automatically regulating the heat, with the object and result of maintaining the predetermined temperature conditions within the oven chamber substantially constant. I have found that, with an oven of the present invention, I may cure a tire in approximately one half the time heretofore required in ovens in commercial use; and in respect to vulcanizing a tire, I have found that the same may be accomplished in approximately sixty minutes (including the time required for placing the tire into and removing it from the oven) and as the oven has capacity for receiving a number of tires at one time, the cost is reduced to approximately 12 cents per tire (including labor and fuel), this being considerably less than what has been the commercial practice.

With the above and other objects in view, the nature of which will be more fully understood from the description hereinafter, the invention consists in the novel construction of ovens for vulcanizing, baking and other uses, as hereinafter more fully described and defined in the claims.

Referring to the drawings: Fig. 1 is a vertical section (side view) through an oven embodying my invention; and Fig. 2 is a front view of the same with part in section.

A is the oven chamber and consists of a circular outer wall with flat back 2, the said oven chamber being provided with a removable cover or lid 3 which is provided with handles 31 for adjusting it and clamping means 34 for holding it tightly in place. These clamping means may be of any usual construction and the cover may be hinged or otherwise, as preferred, these details being immaterial to my invention. Surrounding the oven chamber is an annular hot air jacket 9 providing an annular passage 10 through which the hot products of combustion from the burner 15 circulate and whereby heat is imparted to the outer walls of the oven chamber. The lower part of the jacket 9 opens into the chamber 11 of the gas burner 15; and the heated gases in passing into the annular passage 10 are deflected by a cone shaped deflector 12, so that the hot products are not only divided to both sides of the oven chamber but are also directed to front and back portions of the annular jacket passage 10. The top of the hot air jacket 9 is provided with an opening 13 having a regulating damper 14 which may be adjusted to control the escape of waste or cooler products of combustion and air, it being economical to restrict the escape to a minimum so as to insure a maximum transference of heat through the side walls of the oven chamber. The oven structure as a whole is supported upon legs 19 or in any other suitable manner.

Within the oven chamber there is an annular disc shaped rear baffle plate 4 which is parallel to the back 2 of the oven but leaving a shallow space 7 between it and the back for air circulation. The center of this baffle plate 4 is open as at 6, and the perimeter of the plate is provided with a deep circular flange 5 constituting a peripheral baffle plate and forming the annular air passage 7 opening at the back into the rear space between the back and annular disc 4, and at the front opening into the oven chamber near the lid at 8.

25 is an electric motor supported outside of the oven upon a bracket 29 at the back thereof, the shaft 24 of the motor extending through the rear wall and centrally of the baffle plate opening 6. 23 is a propeller secured to the motor shaft and arranged at the baffle plate opening 6, and is employed to circulate the air, drawing it from the forward part of the oven chamber backward through the passage 7 between the baffle plate 5 and circular wall of the oven, where it is heated, then radially inward between the annular disc baffle plate 4 and back 2 of the oven to the opening 6, and finally discharging it through said opening into the central part of the oven chamber A and toward a conical wall 20 on the inside face of the lid or cover 3 whereby such air as reaches this conical wall is spread radially in all directions. To insure more thorough distribution of the circulating air, I provide the motor shaft with a distributing fan 26, the function of which is to dispense most of the air forced through the opening 6 by the propeller 23, radially within the space bounded by the circular baffle plate 5. In this manner, the heated air content of the oven is maintained at a uniform temperature throughout and being in constant motion, the heating effect upon the articles being treated is uniform for all positions within the oven.

The burner 15 is supplied with gas by a pipe 16 having an automatic control valve 17 thermostatically operated by a thermostat 27 within the oven chamber A and connecting means 28, whereby any increase of temperature above a predetermined degree will cause the valve 17 to be more or less closed and vice versa, thereby automatically operating to maintain a substantially constant temperature within the oven when in operation. 18 is a pilot light for igniting the burner and is more particularly useful should the thermostat completely close off the gas supply to the burner at intervals and require relighting automatically when the gas is again supplied to it. A thermometer 32 is arranged upon the inside of the door or lid 3 and with a window therein through which to read the temperatures indicated. Thermostats for controlling gas burners for regulating temperatures are well known and will need no detailed description as to their construction and operation.

In practice it is desirable to encase the oven including the jacket with suitable insulating covering such as asbestos, but as such coverings are well known and are not an essential part of my invention, I have not illustrated such covering. While such insulation covering aids to save loss of heat from radiation and adds to economy in operation, it is not essential to the operation of the structural features of the invention and hence will need no further mention.

The oven structure above described may be employed for numerous purposes in the industrial arts such as for baking enamel, for drying, for baking treads for tires and vulcanizing tires. In fact there are a great many uses for such an oven, especially where a uniform and constant dry heat is required.

In the illustration of my invention, I have shown the oven as employed for vulcanizing tires; and for conveniently supporting the tires, I provide a bracket 21 extending forward from the rear or back part of the oven chamber, upon which the tires 22 may be suspended, and so that they encircle the distributing fan 26. By this arrangement, the heated air is well circulated over the tires.

It will be understood that by reason of the fact that the air, sealed up within the oven, is thoroughly commingled and circulated by the propeller and distributing fan, it may be heated to a relatively high temperature without danger of injury to the goods being treated, such as would occur if some portions of the interior of the oven were greatly higher in temperature than in other portions, even where the average temperature was no greater than in the case of my oven. Of course, in any case, the maximum temperature must not exceed the permissible temperature allowable for the work to be done; and this is insured by the use of the thermometer and the thermostatically controlled gas supply valve. Aside from the positive results which may be secured by use of my improved oven, these results are more speedily secured because the oven may be operated at its maximum efficiency without danger of injuring the goods being treated.

It will now be apparent that I have devised a novel and useful construction which embodies the features of advantage enumerated as desirable, and while I have in the present instance shown and described the preferred embodiment thereof which has been found in practice to give satisfactory and reliable results, it is to be understood that I do not restrict myself to the details, as the same are susceptible of modification in various particulars without departing from the spirit or scope of the invention.

Having now described my invention, what

I claim as new and desire to secure by Letters Patent, is:

1. An oven of the character stated, comprising an oven chamber of circular form in a vertical plane and of greater diameter than horizontal depth, having a circular jacket surrounding the side walls of the oven and providing a continuous annular jacket passage about the oven chamber from bottom to top for heating products of combustion whereby they circulate upwardly, combined with a heating means outside of the circular jacket for supplying heated products of combustion uniformly to the bottom of the annular jacket passage and means for the escape of the said products at its extreme upper part, and a horizontally arranged bracket secured to the back wall of the oven near its upper portion and extending forward above the central part of the oven a length sufficient for sustaining a plurality of tires.

2. The invention according to claim 1, further chacterized by a circular baffle plate within and near the inner circular wall of the oven and closed near the rear wall of the oven by an annular plate, and by having means for circulating the air through the oven and through the annular passage formed by the baffle plates.

3. An oven of the character stated, comprising an oven chamber of circular form in a vertical plane, having a circular jacket surrounding the oven and providing an annular jacket passage about it for heating products of combustion, combined with a heating means for supplying heated products of combustion to the annular jacket passage at its lower part and means for the escape of the said products at its upper part, and further having the means for circulating the air consisting of a propeller to force the air transversely of the oven and a distributing fan for dispersing the air radially of the oven with circular motion.

4. The invention according to claim 3, further having the oven provided with a horizontally extending bracket arranged above the distributing fan for supporting tires within the oven and about said fan.

5. The invention according to claim 1, further characterized by having the outlet from the upper part of the annular jacket passage provided with an adjustable means for controlling the speed of travel of the heating products around the oven to regulate the temperature thereof and insure uniform action.

6. An oven of the character stated, comprising an oven chamber of circular form in a vertical plane and of greater diameter than horizontal depth, having a circular jacket surrounding the side walls of the oven and providing a continuous annular jacket passage about it from bottom to top for heating products of combustion whereby they circulate upwardly, combined with a heating means for supplying heated products of combustion uniformly to the annular jacket passage at its lower part, means for the escape of the said products at its extreme upper part of the jacket passage, mechanically, means for positively circulating the air within the oven chamber, and a horizontally extending bracket arranged in the upper portion of the oven chamber upon which to suspend the tires to be vulcanized.

7. The invention according to claim 5, further characterized by having the heating means in the form of a burner supplied with a pipe for furnishing a fuel medium thereto, a valve to control the flow of the fuel to the burner, and thermostatic means arranged in the atmosphere within the oven and having a movable part extending to the outside of the oven and connecting with the valve for mechanically operating it and thereby automatically controlling the temperature of the oven.

8. In an oven of the character stated, a circular drum-shaped oven having a closed back and lid covered front, said oven enclosed by an annular jacket passage about its circumference and having openings at top and bottom, a heat generator communicating with the bottom opening of the annular passage; and a deflecting means for diverting the hot gases of the generator partly to one side and partly to the other side of the annular passage.

9. The invention according to claim 8, further characterized by the means for diverting the hot gases being made of inverted conical shape, whereby the gases are distributed into the annular passage both to each side and also to front and back parts thereof.

10. In an oven of the character stated, a closed oven chamber having a closure at its front and provided with an annular jacket enclosing its side walls, combined with means for supplying hot gases to the bottom of the annular passage provided by the jacket for heating the oven, a motor secured to the oven casing at its rear and having a rotating shaft extending into the oven chamber, circulating and dispersing means secured to and rotating with the shaft and baffle plates within the oven chamber for insuring circulation of the air therein and causing it to pass over the oven casing next to the annular jacket passage by which it is heated.

11. The invention according to claim 10, further distinguished by having a conical deflector on the closure directed toward the circulating and distributing means to assist the baffle plates in causing the air to circulate uniformly.

In testimony of which invention, I hereunto set my hand.

KENNETH L. EMMONS.